M. A. OBER.
Churn.
No. 69,363.  Patented Oct. 1, 1867.
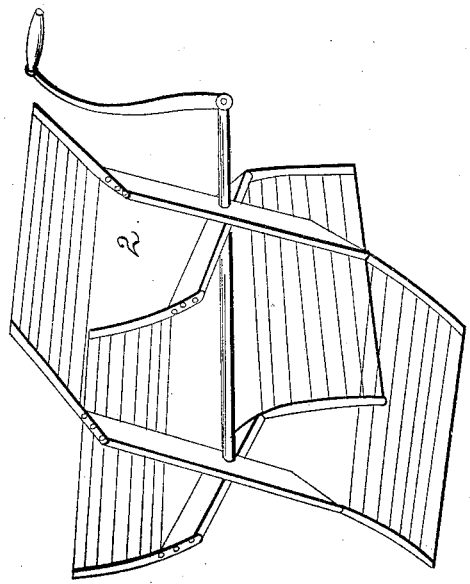
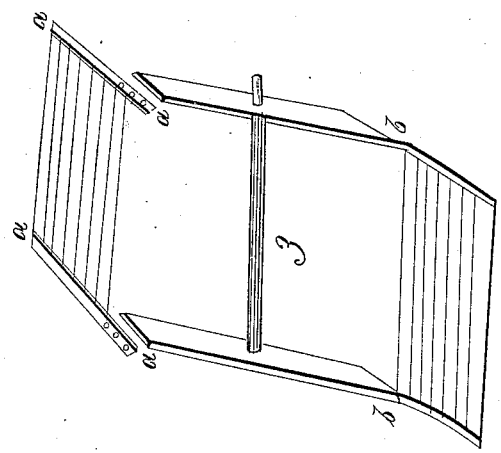

United States Patent Office.

MARIA A. OBER, OF CHAZY, NEW YORK.

Letters Patent No. 69,363, dated October 1, 1867.

---

IMPROVEMENT IN CHURN-DASHERS.

---

The Schedule referred to in these Letters Patent and making part of the same.

---

TO ALL WHOM IT MAY CONCERN:

Be it known that I, MARIA A. OBER, of the town of Chazy, in the county of Clinton, and State of New York, have invented a new and useful improvement to be added to the Crank-Turning Churn-Dasher, for the purpose of separating the particles of butter from the globules of cream and collecting them into a mass without that friction or vehement motion generally produced in the process of churning; and I do hereby declare that the following is a full, clear, and exact description of the construction and operation of the same, reference being had to the annexed drawings, making a part of this specification, in which Figure 2 is a perspective view, Figure 3 a transverse section, and that part between four $a$'s is the cream-whipper, composed of wires, the ends being soldered between narrow strips of doubled tin, or any other metal answering substantially the same purpose, and attached to the arms of wood, as represented at $b$, by means of screws or small nails.

It is operated upon by the crank-turning principle, and its chief merit consists in bringing the cream into butter in one-half of the time, (those that have tested it say one-third,) and with much less labor than that required by the ordinary method of churning, producing at the same time more butter, and a finer quality; for instead of the violent motion which is usual in the churning operation, and which produces heat, so detrimental to the production of good, fine solid-grain butter, the whipper allows the main body of cream to remain in the bottom of the churn while the wires are passing rapidly through it, producing a quality of butter unsurpassed (if equalled) by any method I have ever known.

It may be applied to various forms of churn-dashers, and instead of the wires may be used small rods wrought out of tough timber or the strong cane, but each acting substantially on the same principle and with the same effective result.

What I claim as my invention, and desire to secure by Letters Patent, is—

A churn-dasher, constructed as shown and described.

MARIA A. OBER.

Witnesses:
ROWENA HODGES,
WILLIAM ROSS, Jr.